Nov. 29, 1938.                C. F. FLEMMING                2,138,761
                    METHOD OF PRODUCING A RUBBER ARTICLE
                           Filed July 10, 1934
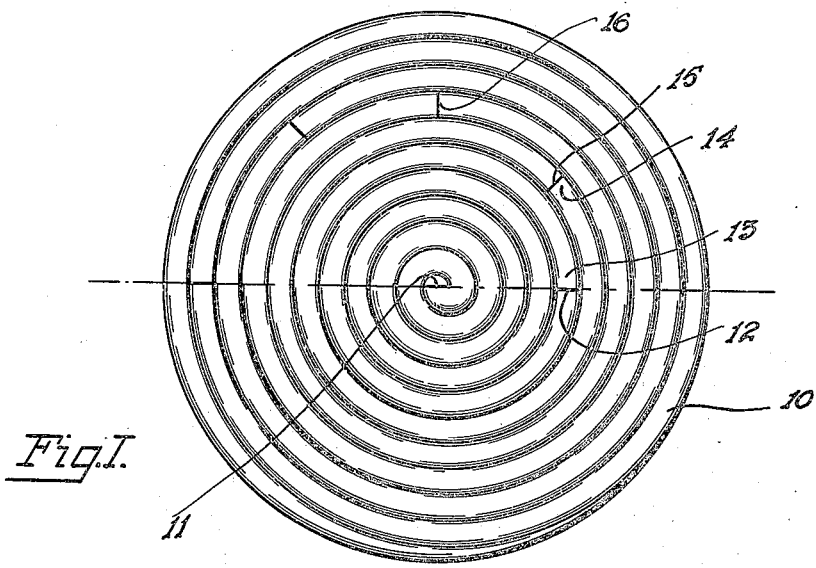
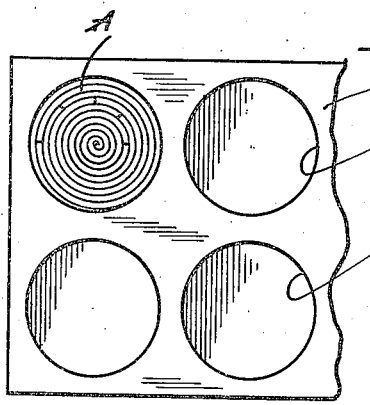
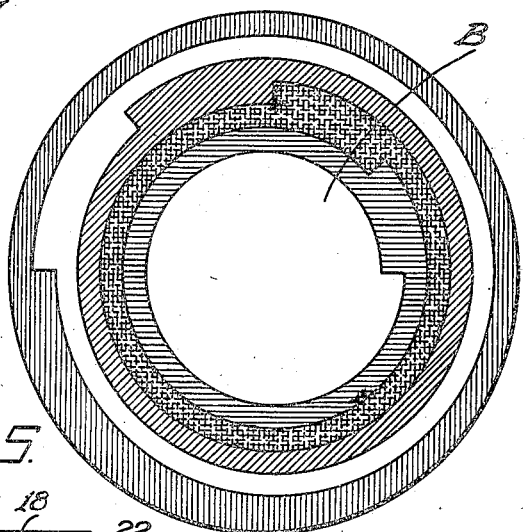
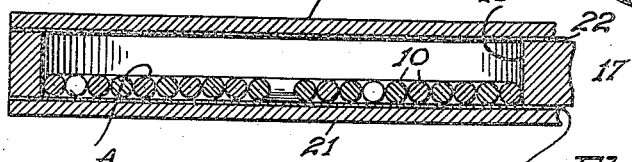
Inventor:
Charles F. Flemming
By George E. Mueller
Atty Patented Nov. 29, 1938

2,138,761

UNITED STATES PATENT OFFICE 2,138,761

METHOD OF PRODUCING A RUBBER ARTICLE

Charles F. Flemming, Cicero, Ill., assignor to Roth Rubber Company, Cicero, Ill., a corporation of Illinois Application July 10, 1934, Serial No. 734,460

11 Claims. (Cl. 18—55)

My invention relates in general to rubber novelties, and in particular to a method for producing rubber articles having sections of different colors all in a homogeneous mass, and particularly colored table pads for drinking glasses and the like, and the product resulting from such method.

At the present time in sponge rubber articles of different colors, the different colored sections are formed separately and then cemented together. They do not form a homogeneous mass. This type of structure not only detracts from the appearance of the finished article, but also makes the product less sturdy, with a comparatively short life.

It is an object of my invention to provide an improved method for making multi-colored rubber articles.

Another object is to provide a multi-colored rubber article in a homogeneous mass.

A further object of my invention is to produce a neater, more attractive appearing colored sponge rubber article.

It is also an object to provide an improved rubber pad by the method of my invention; and A still further object of my invention is to provide a method for producing rubber articles from rubber cord stock of various colors, in which articles said colors combine in a homogeneous mass and stand out in sharp, neat contrasts over the exposed surface thereof.

Other objects and advantages will be apparent from the following description taken with the drawing, in which:

Fig. 1 is a top plan view of the cord stock coiled in a circular form before curing.

Fig. 2 is a sectional view along the line 2—2 of Fig. 1.

Fig. 3 is a fragmentary plan view of a frame or mold within which to cure the coiled rubber stock.

Fig. 4 is a fragmentary sectional view of the mold and press plates for producing a rubber pad.

Fig. 5 is a plan view of the inner cut surface of the completed pad.

In practicing my invention I provide a method for producing colored rubber articles, and in particular colored rubber pads, which consists of coiling a plurality of pieces of round uncured rubber stock into a circular form, curing the stock in a mold shaped to conform to the desired product, expanding said stock, and slicing the cured piece through the middle in a horizontal plane to provide a roughened sponge rubber surface on one side with the multi-colored sections separated in a sharp line division.

Heretofore, attempts have been made to produce rubber novelties of one kind or another having a number of different colored sections over the surface thereof. The difficulty has always been encountered of curing the rubber stock after it has been formed in the desired shape in such a manner that a sharp line division will be provided between each of the various colored sections. In the methods heretofore employed in curing the formed rubber stock, one color will run into that of another so that a very irregular and jagged appearance is provided between each adjacent different color. A squared piece of stock has been employed for making this type of article, but in addition to producing the jagged division between various colors, it has been found that air bubbles and air holes will occur in the cured product between the adjacent colors to prevent the production of a uniform homogeneous sponge rubber mass.

I have found that this difficulty may be overcome and a neat appearing homogeneous cured product may be obtained by employing round sponge rubber stock 10 provided in different lengths and coiled into the desired form as shown in Fig. 1. A suitable sponge rubber stock has been found very satisfactory which includes a blowing agent, pigments, sulphur, a plasticizer in a sufficient quantity to cause the stock to stick together in the coiled form, and an accelerator to facilitate the curing operation. As will be noted from a consideration of Fig. 1, the first piece of colored stock is coiled from the center 11 outwardly to its end 12. A second color 13 is then started at this position and coiled around the color 12 to overlap the end 13 in a portion 14. Subsequently a piece of rubber stock of another color is started at 15, coiled around the piece 13—14 and overlapped at its end 16 in the same manner. This will continue until a structure of the desired size and form is obtained.

In wrapping the round rubber cord stock in one layer upon another, a slight pull is exerted so that the cord itself is stretched slightly and adjacent portions contact in a small surface slightly more than a line contact, yet a surface which is of less width than the diameter of the stock. The resulting form in its uncured state, of course, has an irregular surface on top and bottom as shown in Fig. 2.

After wrapping the cord in the manner described, the piece is put into a mold 17 having a plurality of holes 18 therethrough of a size and shape corresponding to that desired in the finished product. As a matter of convenience, I have illustrated a round hole 18 in which the pad A is inserted as shown in the upper left-hand hole of the device of Fig. 3. Very satisfactory results have been obtained with the use of sponge rubber cord stock 3/16 inch in diameter which, after being wrapped in the manner described, is placed in a hole 18, 1/2 inch in depth and four inches in diameter. Metal press plates 19 and 21 are covered with fabric 22 such as muslin and then clamped against the top and bottom of the mold 17 as shown in Fig. 4. The pad A then rests in the hole 18 at the bottom thereof as illustrated in Fig. 4.

Heat is applied to the mold in the usual manner, and the rubber stock cured and expanded so as to completely fill the space between the plates 19 and 21 in each mold. As heat is applied, the individual cords expand and the air is forced out between adjacent layers of stock and escapes through the holes in the muslin 22 on the top and bottom of the mold. As heretofore explained, in attempts which have been made to make colored rubber articles, particularly with square stock, air pockets form in the curing operation which make the final product practically worthless and certainly injure the appearance. With the round stock, however, in the expansion of the rubber the adjacent pieces in effect knead or roll the air out as the mass gradually fills the entire mold. No air pockets are formed in the pad, and a uniform texture is provide over the entire finished pad, and particularly between adjacent layers of colored stock. After the curing operation is completed and the molds are cooled, the cured rubber plate is removed from the mold, is passed through a wringer to break the cells in the usual manner, and then cut or sawed through the middle in a plane parallel to the outside surface of said plate. This provides a round sponge rubber pad with a somewhat glazed vulcanized surface on one side thereof and a sponge rubber surface on the other side. The spongy rough cut surface B is shown in the plan view of Fig. 5.

I have found that my process provides a surface B in which the division lines separating the rubber of different colors is sharp and distinct exactly as illustrated in Fig. 5. Air bubbles are eliminated and a homogeneous mass with a closely knit surface results. In practicing the process as described above, the product removed from the mold is cut through the middle so that two finished pads are provided from each molded member with the glazed, vulcanized surface on one side and the rough surface described on the other side.

Although I have described my process and product as practiced with a round sponge rubber cord stock, it is understood that I may also employ an irregular shaped cord stock such as one having a hexagonal cross section or the like, which would contact when wrapped in adjacent layers over a surface more than a line contact but less than the width of the particular shaped cord employed, so as to give the rolling action to force out the air in the curing operation. Furthermore, it is understood that I do not limit my invention to the production of a round rubber pad, although it is easily understood that this is a very convenient form inasmuch as the cord stock is always coiled in overlapping relationship.

It is thus seen that I provide a simple and inexpensive method of producing a very neat and attractive multi-colored rubber article and particularly a rubber pad, for drinking glasses and the like. Any desired color combination may be employed, dependent only upon the limits of supply of the raw sponge rubber stock. This same method of production may also be applied in the manufacture of other rubber novelties having a variety of colors over the surface thereof.

Although I have described my invention in its preferred embodiment, I do not limit myself thereby, but limit the invention only by the scope of the appended claims.

I claim:

1. The method of manufacturing a multi-colored sponge rubber pad which consists of placing a plurality of sponge rubber sections formed from cord stock into a mold, the meeting edges of the adjacent sections being substantially less than the thickness of the stock, and expanding and curing the mass in the mold.

2. The method of manufacturing a multi-colored rubber article which consists of wrapping uncured sponge rubber substantially round cord stock in lengths of different colors in spiral relationship, and expanding and curing said rubber in a mold of the desired shape.

3. The method of manufacturing a rubber pad which consists in spirally wrapping in coiled layers uncured rubber cord stock of a cross-section which will engage the next adjacent coiled layer in slightly more than a line contact, but less than the width of said cross-section, placing said wrapped product in a mold, and heating the mold to expand and cure the rubber therein.

4. The method of manufacturing a rubber pad which consists in wrapping in circularly coiled layers, uncured round sponge rubber cord stock which will contact adjacent coiled layers in substantially a line contact, placing said coiled product in a mold, and heating the mold to expand and cure the rubber therein to fill the mold.

5. The method of manufacturing a rubber pad which consists in forming the article by spirally wrapping a plurality of pieces of sponge rubber cord stock with each piece following the preceding in continuous coiled layers with said stock having sufficient suitable plasticizer therein to bind adjacent layers together, heating said formed article in a mold to expand said stock to fill the mold, curing the same in the mold to provide an integral mass, and slicing said formed article in a horizontal plane to provide a two-surfaced pad having one of said sides of a roughened sponge rubber surface.

6. The method of manufacturing a rubber pad which consists in wrapping a plurality of lengths of different colored round sponge rubber cord stock having sufficient suitable plasticizer therein to knit together the peripheral meeting edges of said stock, placing said wrapped product in a mold between fabric-covered press plates, heating said mold to expand said rubber to fill the mold and cure said rubber, and splitting said cured product to provide rubber pads having a spongy top surface with a sharp uniform line separation between adjacent different colors.

7. The method of manufacturing a homogeneous multi-colored sponge rubber article, which consists of wrapping pieces of different colored sponge rubber cord stock in adjacent layers in a manner whereby upon curing said mass in a mold, the adjacent layers will expand to drive out air therebetween in a rolling action to prevent the formation of air pockets in the finished product and provide a homogeneous mass and curing said rubber mass in said mold.

8. The method of manufacturing a multi-colored sponge rubber article which consists in wrapping one after another, a plurality of lengths of different colored sponge rubber cord stock into a spirally wound pad-like mass, with adjacent layers engaging one another in a substantial line contact, placing said mass into a press plate mold for curing, whereby adjacent layers of cord stock will expand to drive out gases therebetween in a rolling action to prevent formation of air pockets, and provide a homogeneous mass in the finished product.

9. The method of manufacturing a rubber pad which consists in assembling a plurality of lengths of different colored sponge rubber cord stock having its contacting sides rounded to engage one another along a single line and progressively therefrom during expansion, and of a character to knit together perfectly, heating said formed mass in a mold to expand said stock to fill the mold, curing the same in the mold to provide an integral mass, and slicing said cured mass in a plane substantially including the original line of contact between said lengths of cord stock to provide two pads, each having one surface bearing an accurately predetermined design.

10. The method of manufacuring a multi-colored sponge rubber pad having a predetermined design on one surface which consists in preliminarily forming said design by placing pieces of sponge rubber stock of different colors into a mold in intimate contact with each other over an area having a vertical width substantially less than the full vertical height of the pieces and in contact with the sides of the mold whereby lateral expansion and distortion of said stock is substantially prevented, heating said mold to cause said stock to expand vertically therein to its vertical height to fill the mold, curing the mass in the mold, and slicing said cured mass along a plane in which said predetermined design is accurately defined.

11. The method of forming a composite sponge rubber article having its portions integrally joined together with the maximum possible strength to provide a solid homogeneous mass, which comprises preliminarily shaping uncured sponge rubber stock portions in such a manner that they will insure contact along a single line, placing said portions in juxtaposition in a mold, heating said placed and shaped portions in a closed mold to cure the same, with said contact between portions progressively spreading from the line contact as the portions expand in the curing operation and in a manner due to said placing and shaping, whereby gas which would otherwise be trapped between the ultimately contacting surfaces can escape between said surfaces before they contact to provide a larger area of positive contact.

CHARLES F. FLEMMING.